US011209810B2

(12) United States Patent
Wang et al.

(10) Patent No.: US 11,209,810 B2
(45) Date of Patent: Dec. 28, 2021

(54) PREDICTING NONCOMPLIANCE CONDITIONS OF ROTATING MACHINERY IN AERIAL VEHICLES

(71) Applicant: THE BOEING COMPANY, Chicago, IL (US)

(72) Inventors: Changzhou Wang, Bellevue, WA (US); Hamid R. Nikjou, Kirkland, WA (US); William S. Hanna, Seattle, WA (US)

(73) Assignee: THE BOEING COMPANY, Chicago, IL (US)

( * ) Notice: Subject to any disclaimer, the term of this patent is extended or adjusted under 35 U.S.C. 154(b) by 390 days.

(21) Appl. No.: 16/427,885

(22) Filed: May 31, 2019

(65) Prior Publication Data

US 2020/0379453 A1 Dec. 3, 2020

(51) Int. Cl.
*G05B 23/02* (2006.01)
*B64C 27/00* (2006.01)
*G07C 5/02* (2006.01)

(52) U.S. Cl.
CPC .......... *G05B 23/0283* (2013.01); *B64C 27/00* (2013.01); *G05B 23/024* (2013.01); *G05B 23/0254* (2013.01); *G07C 5/02* (2013.01)

(58) Field of Classification Search
CPC .............. G05B 23/0283; G05B 23/024; G05B 23/0254; B64C 27/00; G07C 5/02
See application file for complete search history.

(56) References Cited

U.S. PATENT DOCUMENTS

| 10,964,130 B1* | 3/2021 | Dixit | B64F 5/60 |
| 11,086,309 B2* | 8/2021 | Kasahara | G05B 23/027 |
| 11,087,173 B2* | 8/2021 | Hou | G06K 9/42 |

\* cited by examiner

*Primary Examiner* — Mohammad K Islam
(74) *Attorney, Agent, or Firm* — Patterson + Sheridan, LLP

(57) ABSTRACT

Aspects of the present disclosure provide a method and apparatus for predicting noncompliance conditions of rotating machinery in aerial vehicles. Embodiments include receiving records related to historical noncompliance conditions of a plurality of rotating machines. The records include deceleration time values related to the plurality of rotating machines. Embodiments include generating, based at least on the deceleration time values and the historical noncompliance conditions, a predictive model. Embodiments include receiving sensor data related to a rotating machine of an aerial vehicle. Embodiments include determining, based on the sensor data, a series of deceleration time values for the rotating machine. Embodiments include using the predictive model to determine whether a noncompliance condition is predicted to occur for the rotating machine based on the series of deceleration time values.

20 Claims, 5 Drawing Sheets

PREDICTING NONCOMPLIANCE CONDITIONS OF ROTATING MACHINERY IN AERIAL VEHICLES

INTRODUCTION

Aspects of the present disclosure relate to rotating machinery in aerial vehicles and, more particularly, to predicting noncompliance conditions of rotating machinery in aerial vehicles.

Aerial vehicles include various types of rotating machinery. For example, the Air Cycle Machine (ACM) is a component of the air condition pack of an aerial vehicle that provides conditioned air to the cabin and other compartments of the aerial vehicle. In some aerial vehicle models, the ACM is a multi-wheel machine, including one or more turbine wheels and a compressor wheel, equipped with air bearings. In some cases, these ACMs can experience decreased reliability due to moisture entering into the turbine section causing rotary unbalance resulting in air bearing failure, which is an example of a noncompliant condition for the ACM.

Accordingly, there is a need for improved techniques for predicting noncompliance conditions of rotating machinery in aerial vehicles.

BRIEF SUMMARY

Certain embodiments provide a computer-implemented method for predicting noncompliance conditions of rotating machinery in aerial vehicles, comprising: receiving records related to historical noncompliance conditions of a plurality of rotating machines, wherein the records comprise deceleration time values related to the plurality of rotating machines; generating, based at least on the deceleration time values and the historical noncompliance conditions, a predictive model; receiving sensor data related to a rotating machine of an aerial vehicle; determining, based on the sensor data, a series of deceleration time values for the rotating machine; and using the predictive model to determine whether a noncompliance condition is predicted to occur for the rotating machine based on the series of deceleration time values.

In some embodiments, generating, based at least on the deceleration time values and the historical noncompliance conditions, the predictive model comprises: determining a deceleration time pattern based on the deceleration time values; generating one or more features based on the deceleration time pattern; and generating one or more labels based on the historical noncompliance conditions, wherein the predictive model is trained based on the one or more features and the one or more labels.

In certain embodiments, the deceleration time pattern relates to a deceleration time change.

In some embodiments, the deceleration time pattern further relates to a time window associated with the deceleration time change.

In certain embodiments, each deceleration time value of the series of deceleration time values was captured during a shutdown process related to the rotating machine.

In some embodiments, the method further comprises using a subset of the sensor data to establish a baseline condition for the rotating machine.

In certain embodiments, the method further comprises: generating a message based on whether the noncompliance condition is predicted to occur for the rotating machine; and sending the message to a computing device associated with the aerial vehicle.

In some embodiments, the rotating machine comprises an Air Cycle Machine (ACM) equipped with air bearings.

In certain embodiments, the deceleration time values comprise time-to-zero (TTO) values.

Other embodiments provide a system comprising a processor and a non-transitory computer-readable medium comprising instructions that, when executed by the processor, cause the processor to perform the method described above as well as other methods described herein.

Other embodiments provide a non-transitory computer-readable medium comprising instructions that, when executed by a processor of an electronic device, cause the electronic device to perform the method described above as well as other methods described herein.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
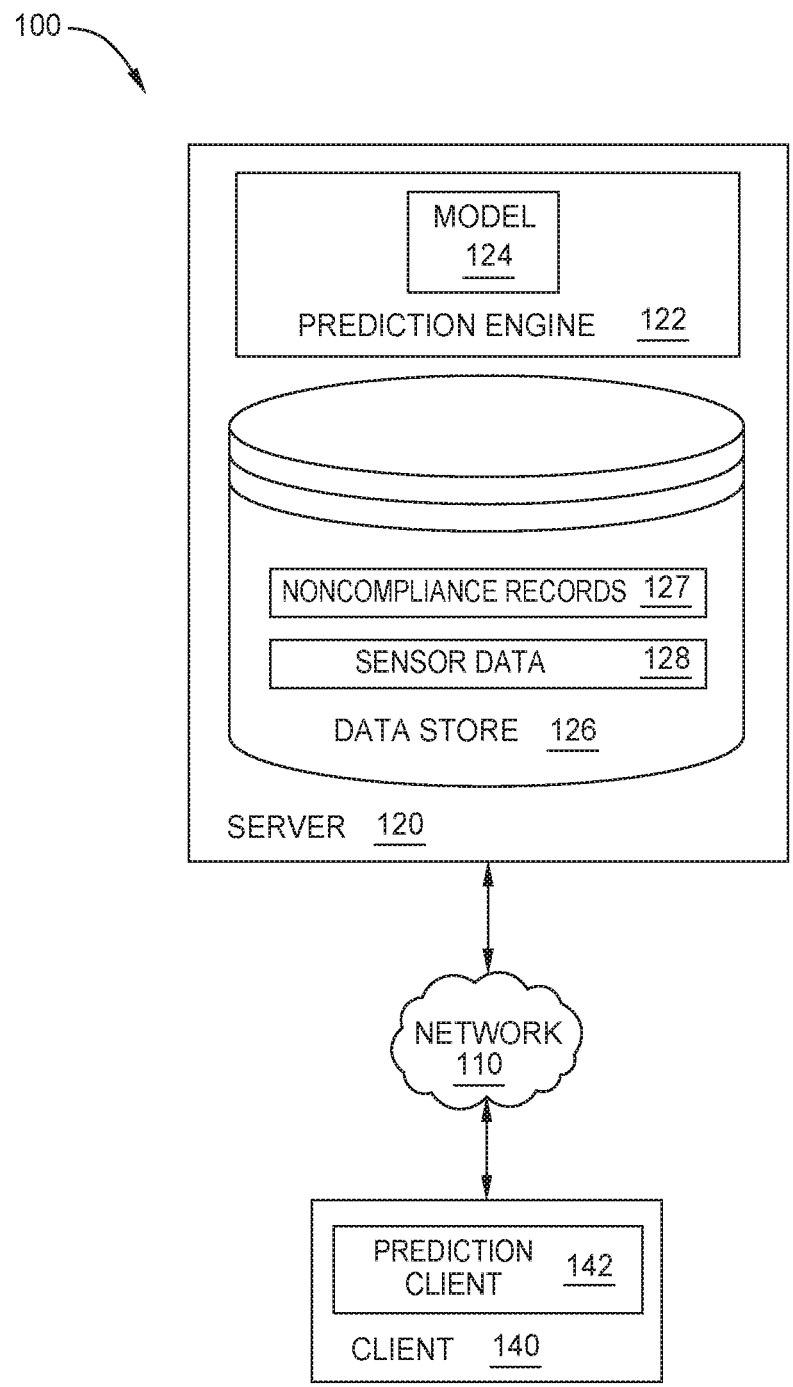
FIG. 1 depicts an example computing environment in which embodiments of the present disclosure may be implemented.

Aspects of the present disclosure provide techniques for predicting noncompliance conditions of rotating machinery in aerial vehicles.

Aerial vehicles include various types of rotating machinery, such as Air Cycle Machines (ACMs). An ACM is a component of the air condition pack of an aerial vehicle that provides conditioned air to the cabin and other compartments of the aerial vehicle. In some aerial vehicle models, the ACM is a multi-wheel machine that includes one or more turbine wheels and a compressor wheel, and is equipped with air bearings that support a shaft between the turbine wheels and compressor wheel. In some cases, water can enter into an ACM when a bypass valve opens, which can occur when a certain altitude is reached. Over time, this water ingestion can degrade the air bearings and, as the ACM friction continues to increase, this can result in a noncompliance condition of the ACM due to seized air bearings. As used herein, a noncompliance condition generally refers to a case in which a component experiences decreased performance, such as performance that falls below a threshold, or a fault condition. In one example, one or more seized air bearings constitutes a noncompliance condition for an ACM.

Described herein are techniques for predicting noncompliance conditions of rotating machinery, such as ACMs, such as to provide sufficient lead time to perform maintenance and potentially prevent noncompliance conditions from occurring.

In certain examples, a prediction engine receives records of historical noncompliance conditions of rotating machines in aerial vehicles, including, for example, historical sensor data. In an embodiment, the prediction engine identifies values and/or patterns in the historical sensor data that are associated with historical noncompliance conditions. For example, the prediction engine identifies deceleration time values in the historical sensor data that are associated with the historical noncompliance conditions. Deceleration time values may, for instance, refer to time-to-zero (TTO) values for ACMs, such as the time it takes for an ACM to decelerate from a given speed to zero. TTO can be indicative of air bearing friction, and as such can be used in predicting noncompliance conditions of ACMs. For example, a lower TTO value generally correlates to higher air bearing friction, which in turn may indicate that a noncompliance condition may occur, such as due to moisture entering the area in which the air bearings are located. In an example, if a TTO value falls below a threshold or falls outside of an acceptable range for a certain window of time, then this may indicate that a noncompliance condition is likely to occur within a certain amount of time.

In some types of aerial vehicles, TTO of an ACM can be determined based on sensor data captured during an engine start process, as the ACM goes through a shutdown and restart process during engine start. In other cases, TTO can be extracted at other times, such as during engine shutdown or other instances where the ACM goes through a shutdown process.

In some embodiments, the prediction engine generates a predictive model for predicting noncompliance conditions based on the records. In one example, the prediction engine generates features based on the historical sensor data and associates the features with labels based on the historical noncompliance conditions. The features and labels are then used, in some embodiments, to train the predictive model using machine learning techniques.

Machine-learning techniques allow computing systems to improve and refine functionality without explicitly being programmed. Given a set of training data, a machine-learning model can generate and refine a function that determines a target attribute value based on one or more input features. A training data set may include various features associated with "labels" that represent target attribute values. In one example, a target attribute is whether or not a noncompliance condition is likely to occur within a certain time period, and features associated with a given target attribute value (e.g., "noncompliance condition occurred" or "noncompliance condition did not occur") include different values and/or patterns relating to deceleration time from the historical sensor data. In other examples, a target attribute may include a probability of whether or not a noncompliance condition will occur, an amount of time until a noncompliance condition is predicted to occur, and so forth.

For instance, if the historical sensor data and the historical noncompliance conditions indicate that the TTO of ACMs tends to drop below a particular threshold for a particular length of time before a noncompliance condition occurs, then this deceleration time pattern (e.g., a series of TTO values indicating the TTO dropping below the particular threshold for the particular length of time) is a feature that may be associated with the label "noncompliance condition occurred".

Once trained based on historical data, the prediction model may be used to predict whether a noncompliance condition is likely to occur, such as within a given time period. In one example, the prediction engine receives sensor data from an aerial vehicle that includes a rotating machine, the sensor data indicating a series of deceleration values for the rotating machine. The series of deceleration values may represent deceleration values captured over a series of flights of the aerial vehicle. The sensor data is then processed to determine one or more input features to provide to the prediction model, such as subsets of the series of deceleration time values that include patterns identified in the series of deceleration values (e.g., a subset of the series of deceleration time values in which deceleration time drops below a threshold and stays below the threshold for a window of time). The prediction model, in this example, then outputs a prediction indicating whether a noncompliance condition is likely to occur for the rotating machine based on the one or more input features.

In some embodiments, messages are generated based on outputs from the prediction model. For instance, in such an embodiment, if a noncompliance condition is predicted to occur, the prediction engine generates a message indicating the prediction and, in some cases, evidence of the prediction, such as the deceleration values that were provided as inputs to the prediction model, and sends the message to a computing device associated with the aerial vehicle, such as a computing device used by an owner or operator of the aerial vehicle. This message may allow a user to receive notification of a predicted noncompliance condition so that action may be taken to prevent the noncompliance condition. For example, maintenance may be performed on the rotating machine in order to prevent the noncompliance condition from occurring.

It is noted that, while certain embodiments involve machine learning, techniques described herein can alternatively or additionally involve different techniques for generating and refining prediction models. For instance, a prediction model may include one or more rules determined based on historical sensor data and historical noncompliance conditions that indicate whether a noncompliance condition is likely to occur. The rules may be generated and/or refined automatically and/or based on input from subject matter experts.

Furthermore, while some embodiments relate to aerial vehicles, techniques described herein may also be employed with respect to other types of vehicles, such as watercraft, ground vehicles, and the like, which have rotating parts.

Example Computing Environment for Predicting Noncompliance Conditions of Rotating Machines FIG. 1 depicts an example computing environment 100 in which embodiments of the present disclosure may be implemented. Computing environment 100 includes a server 120 and a client 140, connected via network 110. Network 110 may represent, for example, a wide area network (WAN), local area network (LAN), wireless LAN (WLAN), personal area network (PAN), a cellular network, the Internet, or any connection over which data may be transmitted.

Server 120 is generally representative of a computing device, such as a server computer or desktop computer.

Server 120 include prediction engine 122, which performs certain operations described herein related to predicting noncompliance conditions of rotating machinery. In certain embodiments, prediction engine 122 communicates via network 110 with prediction client 142 of client 140 and/or additional computing devices in order to request and/or receive noncompliance records 127 and sensor data 128, which prediction engine 122 stores in data store 126, and output messages based on predictions from model 124. In certain embodiments, prediction engine 122 retrieves noncompliance records 127 from another local or remote source, such as from other computing devices associated with aerial vehicles.

Server 120 also includes data store 126, which is generally representative of a data storage entity such as a database or repository, and which may alternatively be implemented as a separate and/or network-accessible storage component. Data store 126 contains noncompliance records 127, which generally represent historical records associated with aerial vehicles that experienced noncompliance conditions, such as historical sensor data associated with historical noncompliance conditions. In some embodiments, the historical sensor data includes deceleration time values, such as TTO values for ACMs. In certain embodiments, the historical sensor data and historical noncompliance conditions in noncompliance records 127 are used to train model 124, as described in more detail below.

Data store 126 further includes sensor data 128, which generally represents data captured by one or more sensors associated with an aerial vehicle, such as during one or more flights. In some cases, sensor data 128 includes deceleration values associated with a rotating machine, such as TTO values for an ACM. In certain embodiments, sensor data 128 includes data from which TTO may be determined, such as speed data. In one example, sensor data 128 was captured during a shutdown process associated with a rotating machine, such as during an engine start process of an aerial vehicle. In some examples, prediction engine 122 receives sensor data 128 from prediction client 142, and stores sensor data 128 in data store 126. In certain embodiments, features derived from sensor data 128 are provided as inputs to the trained model 124 in order to determine predictions, as described in more detail below.

In some embodiments, prediction engine 122 generates model 124 based on noncompliance records 127. For example, prediction engine 122 may identify values and/or patterns of historical sensor data included in noncompliance records 127 that correspond to noncompliance conditions recorded in noncompliance records 127, and may generate training data that includes features based on the values and/or patterns and labels based on the noncompliance conditions. Prediction engine 122 may then use the training data to train model 124, such as by using machine learning techniques, as described below.

Model 124 may be, for instance, a random forest classifier, and training model 124 may involve building a "forest" of "decision trees" representing the training data, where features are randomly permuted for each decision tree. In such embodiments, each decision tree is trained by generating a hierarchy of decision nodes based on sub-divisions of the training data that include features associated with labels. It is noted that random forest techniques are only included as one example, and that other techniques may be employed for training model 124.

Other types of machine learning models such as a Naïve Bayes classification model, linear regression, decision tree, gradient-boosted tree, neural networks, and others may also be used as a model 124. A Naïve Bayes classification model is based on dependent probability, taking into account the probability of a given outcome based on another given outcome. A linear regression model accepts given inputs and calculates the probability of a given outcome, and the label is generally applied based on a threshold for the probability of the given outcome. In an example, if the probability is greater than fifty percent then the label is A, and if the probability is less than fifty percent then the label is B. A decision tree generally determines a classification by dividing given inputs into smaller classifications at nodes, which results in an ultimate classification at a given leaf. Gradient boosting generally refers to a method for optimizing decision-tree based models. Neural networks generally include a collection of connected units or nodes called artificial neurons, which loosely model the neurons in a biological brain. The operation of neural networks can be modeled as an iterative process. Each node has a particular value associated with it. In each iteration, each node updates its value based upon the values of the other nodes, the update operation typically consisting of a matrix-vector multiplication. The update algorithm reflects the influences on each node of the other nodes in the network. In some cases, after prediction engine 122 trains model 124, additional refinement is performed on model 124. For example, if model 124 is a tree-based model such as a random forest classifier, then model 124 may be "pruned" by merging similar leaves, modifying decision boundaries to include values with similar meanings within the relevant domain, and/or otherwise producing a simpler model.

Alternatively, rather than using machine learning techniques, prediction engine 122 may generate model 124 by determining a set of rules based on noncompliance records 127, such as thresholds and/or patterns of certain values (e.g., deceleration values) that are indicative of whether a noncompliance condition is likely to occur. While many embodiments involve automated or programmatic generation and/or refinement of model 124 from training data, certain embodiments involve the use of physical laws or engineering knowledge, such as input provided by a subject matter expert, in generating and/or refining model 124.

In one example, prediction engine 122 uses machine learning techniques to train model 124 based on noncompliance records 127, after which model 124 is manually refined to produce a simplified prediction model that focuses on features that are particularly significant to noncompliance conditions for rotating machinery.

Prediction engine 122 receives sensor data 128, such as from prediction client 142, and uses model 124 to predict whether a noncompliance condition is likely to occur based on sensor data 128. In one example, prediction engine 122 generates one or more features based on sensor data 128, such as values and/or patterns associated with deceleration times, which are generally reflected in a series of deceleration time values, and provides the one or more features as inputs to model 124. Model 124 outputs a prediction of whether or not a noncompliance condition is predicted to occur based on the input features. In one example, model 124 outputs a predicted number of days until a noncompliance condition is predicted to occur, while in other embodiments model 124 outputs a prediction of whether or not a noncompliance condition is predicted to occur within a particular number of days, such as a number of days determined in advance. In certain embodiments, model 124 outputs a probability of whether a noncompliance condition is predicted to occur within a certain time window. In some embodiments, model 124 comprises one or more rules that are applied to aspects of sensor data 128 in order to determine whether a noncompliance condition is predicted to occur.

Determining Initiation Periods of ACMs

When a rotating machine such as an ACM is new, it often goes through an initiation or "breaking in" period. For instance, low deceleration time values early on in the lifecycle of an ACM may not be indicative of an impending noncompliance condition, but may instead indicate that the ACM has not yet reached its normal operating conditions. As such, in some cases, a window of time after a rotating machine is first deployed may be treated as an initiation period, and sensor data captured during this window of time may not be used in predicting noncompliance conditions.

For instance, sensor data captured during the initiation period of a rotating machine may be used to establish a baseline condition of the rotating machine. In some embodiments, prediction engine 122 identifies the window of time (e.g., number of days, number of flights, or the like) for the initiation period of rotating machines based on noncompliance records 127, which may include historical sensor data captured during historical initiation periods of rotating machines. For example, once an initiation period of a rotating machine is identified, sensor data captured during the initiation period for the rotating machine may be disregarded for the purposes of predicting noncompliance conditions.

In certain cases, a baseline condition of a rotating machine is established based on sensor data captured at the end of the initiation period or immediately following the initiation period for the rotating machine. Baseline conditions may be used in predicting whether a noncompliance condition is likely to occur. For example, one or more thresholds or patterns in model 124 may be defined relative to a baseline condition, such as a drop in a deceleration value that is a certain amount below a baseline condition for a given rotating machine. In other embodiments, baseline conditions are not used in determining predictions of whether noncompliance conditions are likely to occur.

In some embodiments, once prediction engine 122 determines a prediction using model 124, prediction engine 122 generates a message based on the prediction. For example, the message may include an indication of whether or not a noncompliance condition is predicted to occur for a given rotating machine, and may also include evidence supporting the prediction. For instance, the evidence may include at least a subset of sensor data 128 or a summary of information related to sensor data 128. In one example, the evidence includes a value or pattern determined from sensor data 128 that indicates that a noncompliance condition is likely to occur. In one example, the evidence includes one or more features that were determined based on sensor data 128, and that were used as inputs to model 124. Prediction engine 122 may then provide the message to one or more computing systems, such as client 140, for display to a user, such as for use in scheduling or performing maintenance on the given rotating machine.

Client 140 generally represents a computing device, such as a computing system associated with an aerial vehicle or an owner or operator of an aerial vehicle. Client 140 includes prediction client 142, which generally represents a client-side component that corresponds to prediction engine 122.

In some embodiments, prediction client 142 receives sensor data 128 from one or more components associated with an aerial vehicle, such as over a series of flights, and provides sensor data 128 to prediction engine 122. In certain embodiments, prediction client 142 includes a user interface component that displays messages received from prediction engine 122, such as messages indicating predicted noncompliance conditions for rotating machines associated with the aerial vehicle and evidence thereof.

It is noted that client 140 is included to be representative of a plurality of different client systems. In certain embodiments, prediction engine 122 communicates with a large number of client systems associated with aerial vehicles from a plurality of transportation providers, such as airlines.

Figure 2:
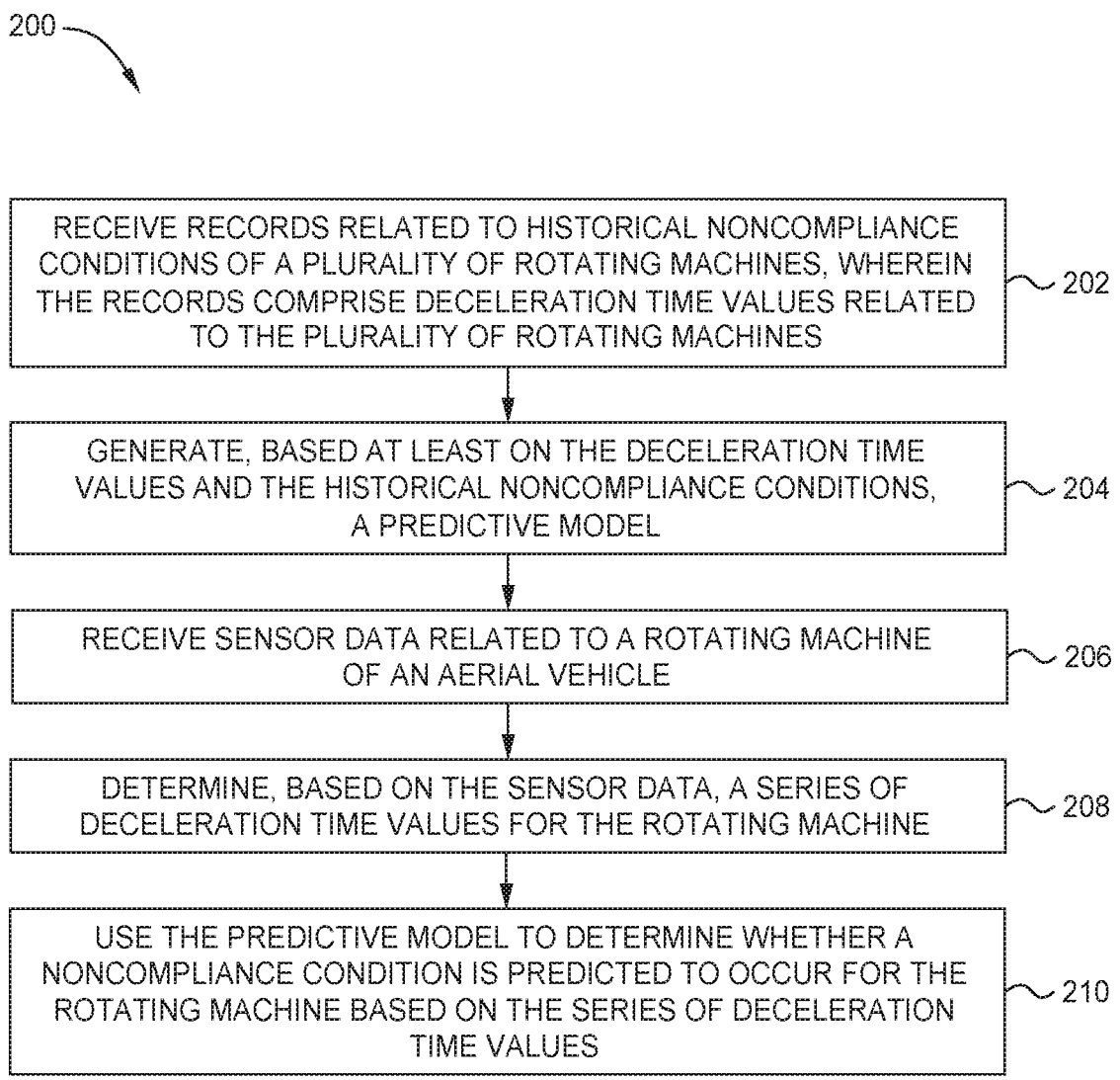
FIG. 2 illustrates example operations related to predicting noncompliance conditions for rotating machinery in aerial vehicles.

Example Operations for Predicting Noncompliance Conditions for Rotating Machinery FIG. 2 illustrates example operations 200 related to predicting noncompliance conditions for rotating machinery. In some implementations, operations 200 are performed by prediction engine 122 of FIG. 1.

At 202, records related to historical noncompliance conditions of a plurality of rotating machines are received, wherein the records comprise deceleration time values related to the plurality of rotating machines. In one example, prediction engine 122 of FIG. 1 receives noncompliance records 127 of FIG. 1 from prediction client 142 of FIG. 1. The records generally include historical sensor data, including deceleration time values for rotating machines such as ACMs, associated with historical noncompliance conditions from a plurality of aerial vehicles.

At 204, a predictive model is generated based at least on the deceleration time values and the historical noncompliance conditions. In one example, prediction engine 122 of FIG. 1 determines one or more features based on the deceleration time values, such as particular patterns in the deceleration time values, associated with labels corresponding to the historical noncompliance conditions. In one example, a feature comprises a deceleration time value dropping below a threshold for a given window of time. In another example, a feature comprises a deceleration time value dropping by a certain amount, such as at a certain rate or over a certain window of time. Each feature may be associated with a label indicating whether the feature is associated with a historical noncompliance condition. The features and labels are then used to generate the predictive model.

In one example, prediction engine 122 of FIG. 1 trains model 124 of FIG. 1 using a training data set comprising the features and labels. In other examples, prediction engine 122 of FIG. 1 determines one or more rules based on the deceleration time values and the historical noncompliance conditions, and generates the prediction model based on the one or more rules.

In some examples, the prediction model is further refined, such as by merging similar features, simplifying rules, and/or adjusting weights. In some embodiments the prediction model is generated and/or refined automatically by prediction engine 122 of FIG. 1, while in other embodiments user input may be involved.

At 206, sensor data related to a rotating machine of an aerial vehicle is received. In an example, prediction engine 122 of FIG. 1 receives sensor data 128 of FIG. 1 from prediction client 142 of FIG. 1, which may be associated with an aerial vehicle that includes a rotating machine, such as an ACM. In some embodiments, the sensor data includes deceleration time values, such as TTO values or speed data from which TTO values can be determined, for the rotating machine. In some cases, the sensor data includes data captured over a series of flights, such as during shutdown periods associated with the rotating machine. For example, the rotating machine may go through a shutdown process during an engine start process for the aerial vehicle, and so deceleration time values may be captured during the engine start process for each flight. In other embodiments, the sensor data is captured at other times, such as during an engine shutdown process for the aerial vehicle.

At 208, a series of deceleration time values for the rotating machine are determined based on the sensor data. In an example, prediction engine 122 of FIG. 1 determines a deceleration time value, such as a TTO value, for the rotating machine for each flight of a series of flights for which sensor data is included in the sensor data received at 206. In some embodiments, the sensor data includes the deceleration time values, while in other embodiments the sensor data includes other data, such as speed values, from which the deceleration time values are determined.

In some embodiments, prediction engine 122 of FIG. 1 determines whether an initiation period for the rotating machine has been completed, such as based on the series of deceleration time values, using the predictive model, and/or based on a time window. In some embodiments, prediction engine 122 of FIG. 1 establishes a baseline condition for the rotating machine based on at least a subset of the series of deceleration time values, such as deceleration values during a first part of the series or deceleration time values immediately following an initiation period. In one example, prediction engine 122 of FIG. 1 does not use any deceleration time values during an initiation period for the rotating machine for predicting noncompliance conditions.

At 210, the predictive model is used to determine whether a noncompliance condition is predicted to occur for the rotating machine based on the series of deceleration time values.

In some embodiments, prediction engine 122 of FIG. 1 determines one or more features based on the deceleration time values, such as one or more values or patterns, and provides the one or more features as inputs to the predictive model generated at 204. In some examples, the predictive model outputs a prediction regarding whether a noncompliance condition is likely to occur within a certain time period based on the one or more features.

In other embodiments, the predictive model outputs a predicted period of time, such as a number of days, until a noncompliance condition is expected to occur based on the one or more features. In other embodiments, the predictive model includes one or more rules that are applied to the series of deceleration time values to determine whether a noncompliance condition is predicted to occur. For instance, the rules may include thresholds, time windows, changes in deceleration time values, rates of change, and/or the like that indicate a noncompliance condition is likely to occur.

In one example, if the series of deceleration time values indicate that the deceleration time for the rotating machine dropped below a threshold for a given window of time, then prediction engine 122 of FIG. 1 predicts that a noncompliance condition is likely to occur. In another example, if the series of deceleration time values indicate that the deceleration time for the rotating machine dropped a certain amount, such as from a baseline condition or from an earlier value, such as for a given window of time, then prediction engine 122 of FIG. 1 predicts that a noncompliance condition is likely to occur. In another example, if the series of deceleration time values indicate that the deceleration time for the rotating machine dropped at a certain rate, then prediction engine 122 of FIG. 1 predicts that a noncompliance condition is likely to occur.

In some embodiments, once prediction engine 122 of FIG. 1 determines whether a noncompliance condition is predicted to occur for the rotating machine, prediction engine 122 of FIG. 1 generates a message indicating whether or not the noncompliance condition is predicted to occur. In some cases, prediction engine 122 of FIG. 1 also includes evidence of the prediction in the message, such as at least a subset of the series of deceleration time values or features used to determine the prediction. In certain embodiments, prediction engine 122 of FIG. 1 sends the message to a computing device associated with the aerial vehicle, such as client 140 of FIG. 1 for display to a user. In some cases, the message is used to schedule or perform maintenance in order to prevent the predicted noncompliance condition from occurring.

Example Deceleration Time Values

Figure 3:
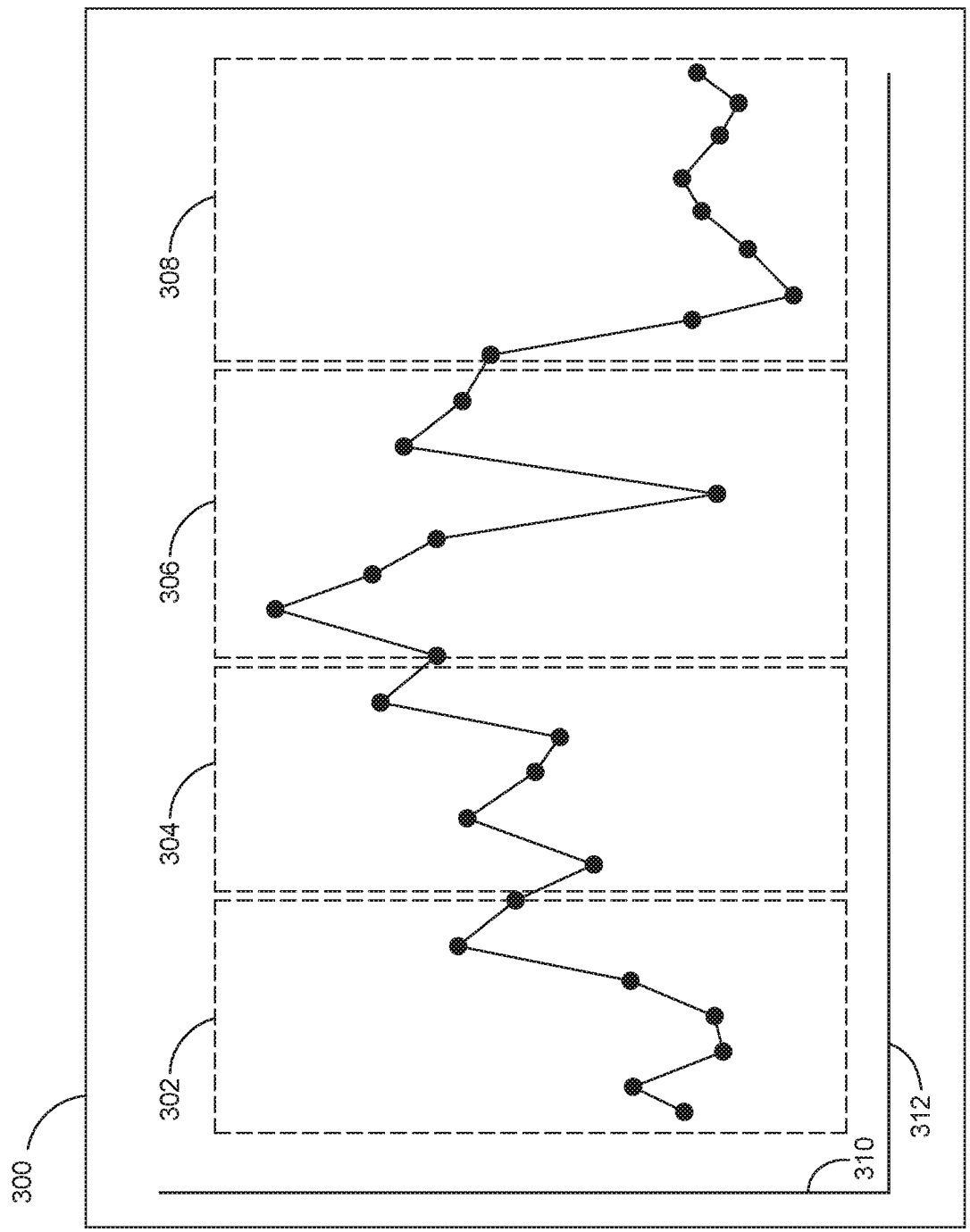
FIG. 3 illustrates an example graph of deceleration time values associated with rotating machinery in aerial vehicles.

FIG. 3 illustrates an example graph 300 of deceleration time values associated with rotating machinery in aerial vehicles. For example, graph 300 may represent a series of deceleration time values included in sensor data 128 of FIG. 1, which may have been captured over a series of flights. In some embodiments, each point in graph 300 represents a deceleration time value that was captured during a shutdown process associated with a rotating machine. The Y axis 310 of graph 300 generally represents deceleration time, while the X axis 312 of graph 300 generally represents time.

Graph 300 includes sections 302, 304, 306, and 308, which represent different subsets of deceleration time values. In one example, section 302 represents an initiation period for the rotating machine. For example, the deceleration time values shown in section 302 may represent values captured during a breaking-in period for the rotating machine, which may be determined based on an initial time window, based on one or more patterns, using a predictive model, and/or the like. While section 302 includes low deceleration time values, these low values may not result in a predicted noncompliance condition because they occur during the initiation period of the rotating machine.

Section 304 generally represents a normal condition for the rotating machine, during which noncompliance conditions are not predicted to occur. In an example, the points in section 304 represent deceleration time value patterns that are not associated with historical noncompliance conditions. As such, a predictive model according to embodiments described herein may not predict that a noncompliance condition is likely to occur based on the values in section 304.

Section 306 generally represents a period of fluctuating deceleration time values. In one example, while section 306 includes a significant drop in deceleration time, the drop does not result in a predicted noncompliance condition, because the drop does not last for a sufficient window of time. The drop in deceleration time that occurs during section 306 is brief, as the deceleration time promptly returns to a higher value.

Section 308 generally represents a period in which a noncompliance condition may be predicted to occur. In section 308, the deceleration time drops substantially, such as below a threshold, and remains low for a certain window of time. As such, in one example, a noncompliance condition is predicted to occur within a certain amount of time based on the deceleration time values in section 308. For instance, the deceleration time values in section 308 may correspond to historical deceleration time values associated with historical noncompliance conditions. As such, a predictive model trained based on the historical deceleration time values and historical noncompliance conditions according to embodiments described herein may output a prediction that a noncompliance condition is likely to occur based on the deceleration time values in section 308.

It is noted that graph 300 is only included as an example, and any values, patterns, or time windows discussed with respect to graph 300 are only included as examples.

Example Embodiment of Predicting Noncompliance Conditions

Figure 4:
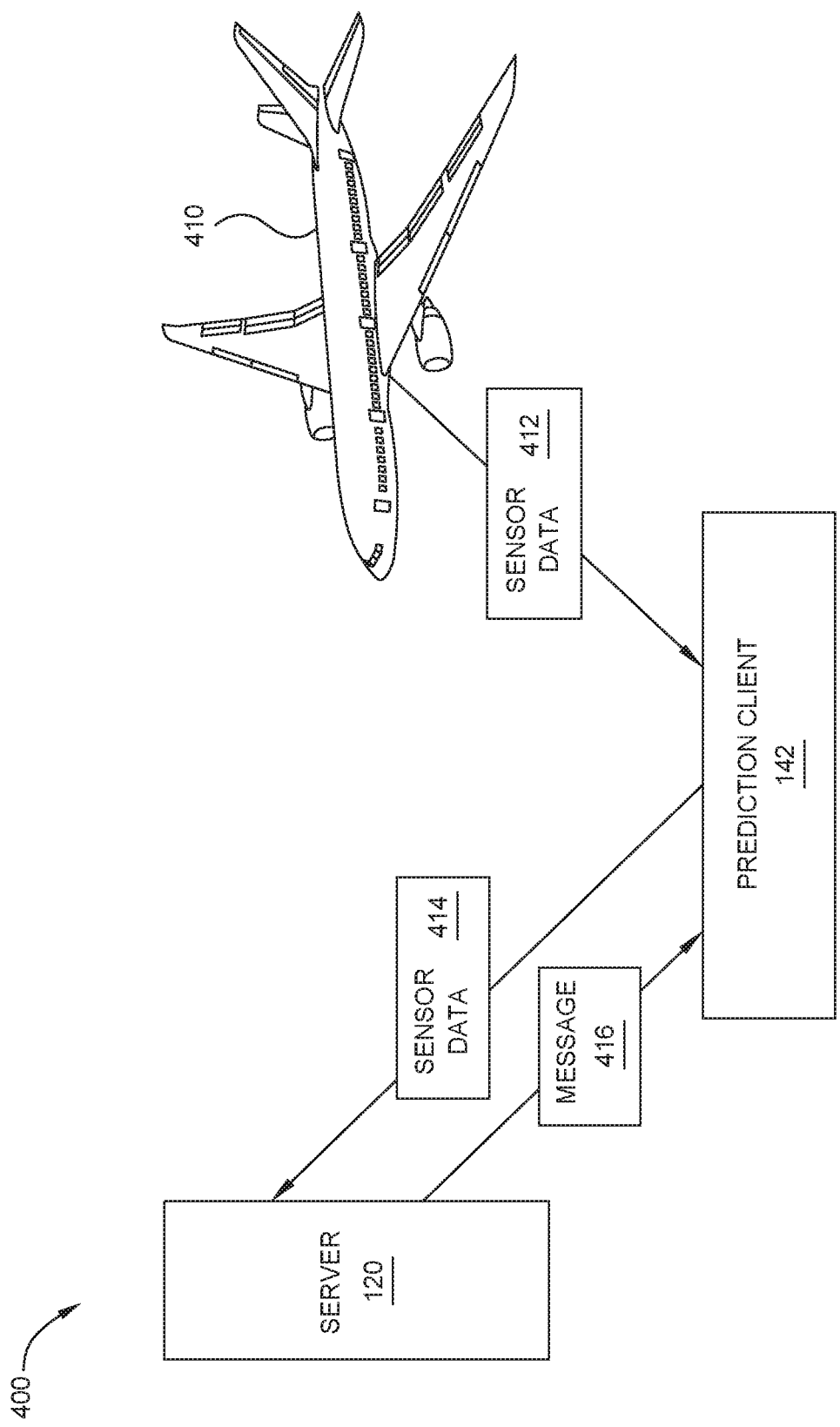
FIG. 4 illustrates an example embodiment of predicting noncompliance conditions for rotating machinery in aerial vehicles.

FIG. 4 illustrates an example embodiment 400 of predicting noncompliance conditions for rotating machinery in aerial vehicles. Embodiment 400 includes server 120 and prediction client 142 of FIG. 1.

Embodiment 400 further includes aircraft 410, which is generally representative of an aerial vehicle. While embodiment 400 includes aircraft 410, it is noted that techniques described herein may be implemented in other contexts, such as with other types of vehicles or systems (e.g., ground vehicles, watercraft, etc.). In some embodiments, aircraft 410 includes one or more rotating machines, such as ACMs. In certain embodiments prediction client 142 is associated with an owner or operator of aircraft 410, such as an airline.

In embodiment 400, sensor data 412 is sent from aircraft 410 to prediction client 142. In an example, sensor data 412 includes values related to deceleration time of a rotating machine, and is captured using one or more sensors within aircraft 410 during a series of flights.

Prediction client 142 sends sensor data 414 to server 120. For instance, sensor data 414 may be the same as sensor data 412. Prediction client 142 may send sensor data 414 to server 120 in order to determine whether a noncompliance condition is predicted to occur for the rotating machine. In alternative embodiments, sensor data 412 is sent directly from aircraft 410 to server 120.

In some embodiments, server 120 determines whether a noncompliance condition is predicted to occur for the rotating machine based on sensor data 414. In one example, server 120 determines one or more features based on sensor data 414, and provides the one or more features as inputs to a prediction model, which outputs a prediction. Sever 120 then generates message 416 based on the prediction, and sends message 416 to prediction client 142.

Message 416 indicates whether a noncompliance condition is predicted to occur for the rotating machine based on sensor data 414. In some embodiments, message 416 includes evidence of the prediction, such as a subset of sensor data 414 that is indicative of the predicted noncompliance condition. In some cases, prediction client 142 displays message 416 to a user via a user interface. As such, message 416 may be used to schedule and/or perform maintenance on the rotating machine of aircraft 410 in order to prevent the predicted noncompliance condition from occurring. Preventing noncompliance conditions from occurring may result in substantial cost savings and improved safety and comfort within aircraft 410.

Figure 5:
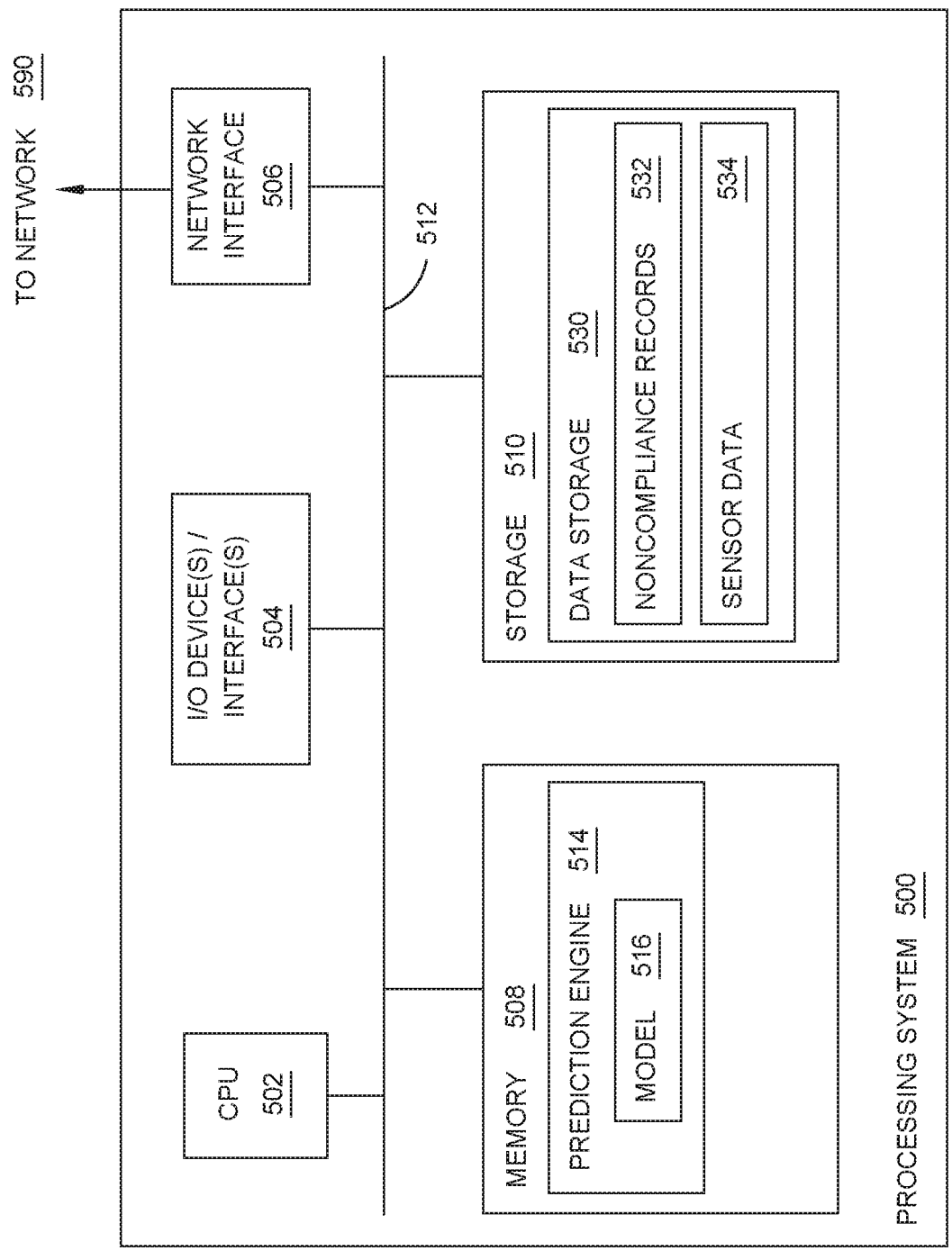
FIG. 5 illustrates an example processing system with which embodiments of the present disclosure may be implemented.

Example Processing System for Predicting Noncompliance Conditions for Rotating Machinery FIG. 5 depicts a processing system 500 that may be used to perform methods described herein, such as the operations 200 for predicting noncompliance conditions for rotating machinery in aerial vehicles described above with respect to FIG. 2. In certain embodiments, processing system 500 is representative of server 120 of FIG. 1. In other embodiments, certain components of processing system 500 are representative of client 140. For example, all components of processing system 500 other than the contents of memory 508 and storage 510 may be representative of components of client 140.

Processing system 500 includes a CPU 502 connected to a data bus 512. CPU 502 is configured to process computer-executable instructions, e.g., stored in memory 508 or storage 510, and to cause processing system 500 to perform methods as described herein, for example with respect to FIG. 2. Though depicted as only including only one CPU 502, processing system 500 may have more than one processor.

Processing system 500 further includes input/output device(s) and interface(s) 504, which allows processing system 500 to interface with input/output devices, such as, for example, keyboards, displays, mouse devices, pen input, and other devices that allow for interaction with processing system 500. Note that while not depicted with independent external I/O devices, processing system 500 may connect with external I/O devices through physical and wireless connections (e.g., an external display device).

Processing system 500 further includes network interface 506, which provides processing system 500 with access to external networks, such as network 590, and thereby external computing devices.

Processing system 500 further includes memory 508, which in this example includes prediction engine 514, comprising model 516 which may correspond to prediction engine 122 and model 124 of FIG. 1, and may perform operations described above with respect FIG. 2. In one example, prediction engine 514 generates a prediction model based on historical sensor data and historical noncompliance conditions recorded in noncompliance records 532 and uses the prediction model to predict noncompliance conditions based on sensor data 534, as described above with respect to FIGS. 1-4.

Note that while shown as a single memory 508 in FIG. 5 for simplicity, the aspects stored in memory 508 may be stored in different physical memories, but all accessible to CPU 502 via data connections, such as bus 512.

Processing system 500 further includes storage 510, which in this example includes data store 530, which generally represents data store 126 of FIG. 1. Data store 530 includes noncompliance records 532 and sensor data 534, which generally represent noncompliance records 127 and sensor data 128 of FIG. 1.

While not depicted in FIG. 5, other aspects may be included in storage 510.

As with memory 508, a single storage 510 is depicted in FIG. 5 for simplicity, but the various aspects stored in storage 510 may be stored in different physical storages, but all accessible to CPU 502 via internal data connections, such as bus 512, I/O interfaces 505, or external connection, such as network interface 506.

Example Embodiments

The following are example embodiments. Notably, the reference numerals in the examples below are merely examples. Further, even if single claim dependencies are indicated in the following examples, or in the claims below, all claim dependencies, including multiple claim dependencies, are included within the scope of the present disclosure.

Embodiment 1

A method for predicting noncompliance conditions of rotating machinery in aerial vehicles, comprising: receiving records (127) related to historical noncompliance conditions of a plurality of rotating machines, wherein the records comprise deceleration time values related to the plurality of rotating machines (202); generating, based at least on the deceleration time values and the historical noncompliance conditions, a predictive model (124, 204); receiving sensor data (128) related to a rotating machine of an aerial vehicle (410, 206); determining, based on the sensor data, a series of deceleration time values (300) for the rotating machine (208); and using the predictive model (124) to determine whether a noncompliance condition is predicted to occur for the rotating machine based on the series of deceleration time values (210).

Embodiment 2

The method of Embodiment 1, wherein generating, based at least on the deceleration time values and the historical noncompliance conditions (128), the predictive model (124) comprises: determining a deceleration time pattern based on the deceleration time values (300); generating one or more features based on the deceleration time pattern (300); and generating one or more labels based on the historical noncompliance conditions (128), wherein the predictive model is trained based on the one or more features and the one or more labels (124, 204).

Embodiment 3

The method of Embodiment 2, wherein the deceleration time pattern relates to a deceleration time change (300).

Embodiment 4

The method of Embodiment 3, wherein the deceleration time pattern further relates to a time window associated with the deceleration time change (300).

Embodiment 5

The method of Embodiment 1, wherein each deceleration time value of the series of deceleration time values was captured during a shutdown process related to the rotating machine (300).

Embodiment 6

The method of Embodiment 1, further comprising using a subset of the sensor data to establish a baseline condition for the rotating machine (300).

Embodiment 7

The method of Embodiment 1, further comprising: generating a message based on whether the noncompliance condition is predicted to occur for the rotating machine (416); and sending the message (416) to a computing device (142) associated with the aerial vehicle (410).

Embodiment 8

The method of Embodiment 1, wherein the rotating machine comprises an air cycle machine (ACM) equipped with air bearings (410).

Embodiment 9

The method of Embodiment 1, wherein the deceleration time values comprise time-to-zero (TTO) values (300).

Embodiment 10

A system (500) comprising a processor (502) and a non-transitory computer-readable medium (508) comprising instructions that, when executed by the processor, cause the processor to perform methods of Embodiments 1-9.

Embodiment 11

A non-transitory computer-readable medium (508) comprising instructions that, when executed by a processor (502), cause the processor to perform methods of Embodiments 1-9.

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for predicting noncompliance conditions of rotating machinery in aerial vehicles, comprising:
   receiving records related to historical noncompliance conditions of a plurality of rotating machines, wherein the records comprise deceleration time values related to the plurality of rotating machines;
   generating, based at least on the deceleration time values and the historical noncompliance conditions, a predictive model;
   receiving sensor data related to a rotating machine of an aerial vehicle;
   determining, based on the sensor data, a series of deceleration time values for the rotating machine; and
   using the predictive model to determine whether a noncompliance condition is predicted to occur for the rotating machine based on the series of deceleration time values.

2. The method of claim 1, wherein generating, based at least on the deceleration time values and the historical noncompliance conditions, the predictive model comprises:
   determining a deceleration time pattern based on the deceleration time values;
   generating one or more features based on the deceleration time pattern; and
   generating one or more labels based on the historical noncompliance conditions, wherein the predictive model is trained based on the one or more features and the one or more labels.

3. The method of claim 2, wherein the deceleration time pattern relates to a deceleration time change.

4. The method of claim 3, wherein the deceleration time pattern further relates to a time window associated with the deceleration time change.

5. The method of claim 1, wherein each deceleration time value of the series of deceleration time values was captured during a shutdown process related to the rotating machine.

6. The method of claim 1, further comprising using a subset of the sensor data to establish a baseline condition for the rotating machine.

7. The method of claim 1, further comprising:
   generating a message based on whether the noncompliance condition is predicted to occur for the rotating machine; and
   sending the message to a computing device associated with the aerial vehicle.

8. The method of claim 1, wherein the rotating machine comprises an air cycle machine (ACM) equipped with air bearings.

9. The method of claim 1, wherein the deceleration time values comprise time-to-zero (TTO) values.

10. A system comprising a processor and a non-transitory computer-readable medium comprising instructions that, when executed by the processor, cause the processor to perform a method for predicting noncompliance conditions of rotating machinery in aerial vehicles, the method comprising:
    receiving records related to historical noncompliance conditions of a plurality of rotating machines, wherein the records comprise deceleration time values related to the plurality of rotating machines;
    generating, based at least on the deceleration time values and the historical noncompliance conditions, a predictive model;
    receiving sensor data related to a rotating machine of an aerial vehicle;
    determining, based on the sensor data, a series of deceleration time values for the rotating machine; and
    using the predictive model to determine whether a noncompliance condition is predicted to occur for the rotating machine based on the series of deceleration time values.

11. The system of claim 10, wherein generating, based at least on the deceleration time values and the historical noncompliance conditions, the predictive model comprises:
    determining a deceleration time pattern based on the deceleration time values;
    generating one or more features based on the deceleration time pattern; and
    generating one or more labels based on the historical noncompliance conditions, wherein the predictive model is trained based on the one or more features and the one or more labels.

12. The system of claim 11, wherein the deceleration time pattern relates to a deceleration time change.

13. The system of claim 12, wherein the deceleration time pattern further relates to a time window associated with the deceleration time change.

14. The system of claim 10, wherein each deceleration time value of the series of deceleration time values was captured during a shutdown process related to the rotating machine.

15. The system of claim 10, further comprising using a subset of the sensor data to establish a baseline condition for the rotating machine.

16. The system of claim 10, further comprising:
    generating a message based on whether the noncompliance condition is predicted to occur for the rotating machine; and
    sending the message to a computing device associated with the aerial vehicle.

17. The system of claim 10, wherein the rotating machine comprises an air cycle machine (ACM) equipped with air bearings.

18. The system of claim 10, wherein the deceleration time values comprise time-to-zero (TTO) values.

19. A non-transitory computer-readable medium comprising instructions that, when executed by a processor, cause the processor to perform a method for predicting noncompliance conditions of rotating machinery in aerial vehicles, the method comprising:
    receiving records related to historical noncompliance conditions of a plurality of rotating machines, wherein the records comprise deceleration time values related to the plurality of rotating machines;
    generating, based at least on the deceleration time values and the historical noncompliance conditions, a predictive model;
    receiving sensor data related to a rotating machine of an aerial vehicle;
    determining, based on the sensor data, a series of deceleration time values for the rotating machine; and
    using the predictive model to determine whether a noncompliance condition is predicted to occur for the rotating machine based on the series of deceleration time values.

20. The non-transitory computer-readable medium of claim 19, wherein generating, based at least on the deceleration time values and the historical noncompliance conditions, the predictive model comprises:

determining a deceleration time pattern based on the deceleration time values;
generating one or more features based on the deceleration time pattern; and
generating one or more labels based on the historical noncompliance conditions, wherein the predictive model is trained based on the one or more features and the one or more labels.

* * * * *